US006636670B2

(12) United States Patent
Deufel

(10) Patent No.: US 6,636,670 B2
(45) Date of Patent: Oct. 21, 2003

(54) DEVICE FOR GENERATING ELECTRICAL SIGNAL THAT IS A FUNCTION OF THE OPTICAL POWER IN OPTICAL FIBER, AND METHOD OF FORMING THE SAME

(75) Inventor: David C. Deufel, Lebanon, PA (US)

(73) Assignee: Gould Optronics, Inc., Millersville, MD (US)

( * ) Notice: Subject to any disclaimer, the term of this patent is extended or adjusted under 35 U.S.C. 154(b) by 55 days.

(21) Appl. No.: 09/956,719

(22) Filed: Sep. 20, 2001

(65) Prior Publication Data

US 2003/0053755 A1 Mar. 20, 2003

(51) Int. Cl.[7] .............................. G02B 6/26; G02B 6/42; G02B 6/36
(52) U.S. Cl. .............................. 385/43; 385/45; 385/48; 385/49; 385/88
(58) Field of Search .............................. 385/43, 45, 48, 385/49, 88, 89

(56) References Cited

U.S. PATENT DOCUMENTS

| 4,632,513 A | | 12/1986 | Stowe et al. | |
|---|---|---|---|---|
| 4,738,511 A | * | 4/1988 | Fling | 385/30 |
| 4,772,085 A | | 9/1988 | Moore et al. | |
| 4,779,945 A | * | 10/1988 | Hill et al. | 385/42 |
| 4,798,438 A | | 1/1989 | Moore et al. | |
| 4,834,481 A | | 5/1989 | Lawson et al. | |
| 4,941,724 A | * | 7/1990 | Couden et al. | 385/48 |
| RE33,296 E | | 8/1990 | Stowe et al. | |
| 5,355,426 A | | 10/1994 | Daniel et al. | |
| 5,500,917 A | | 3/1996 | Daniel et al. | |
| 5,644,666 A | | 7/1997 | Campbell et al. | |
| 5,682,453 A | | 10/1997 | Daniel et al. | |
| 6,275,516 B1 | * | 8/2001 | Arney et al. | 372/71 |

* cited by examiner

*Primary Examiner*—Robert H. Kim
*Assistant Examiner*—Michael H Caley
(74) *Attorney, Agent, or Firm*—Shaw Pittman LLP

(57) ABSTRACT

A device for generating an electrical signal that is a function of the optical power in an optical fiber. The device is comprised of a support substrate, a fused, bi-conically-tapered splitter-coupler, and a glass bead securing an optical fiber extending from the splitter-coupler to the substrate. An opening in the glass bead forms a gap in the optical fiber. A light-sensitive device is disposed in the opening to receive light traveling through the optical fiber from the splitter-coupler.

20 Claims, 2 Drawing Sheets

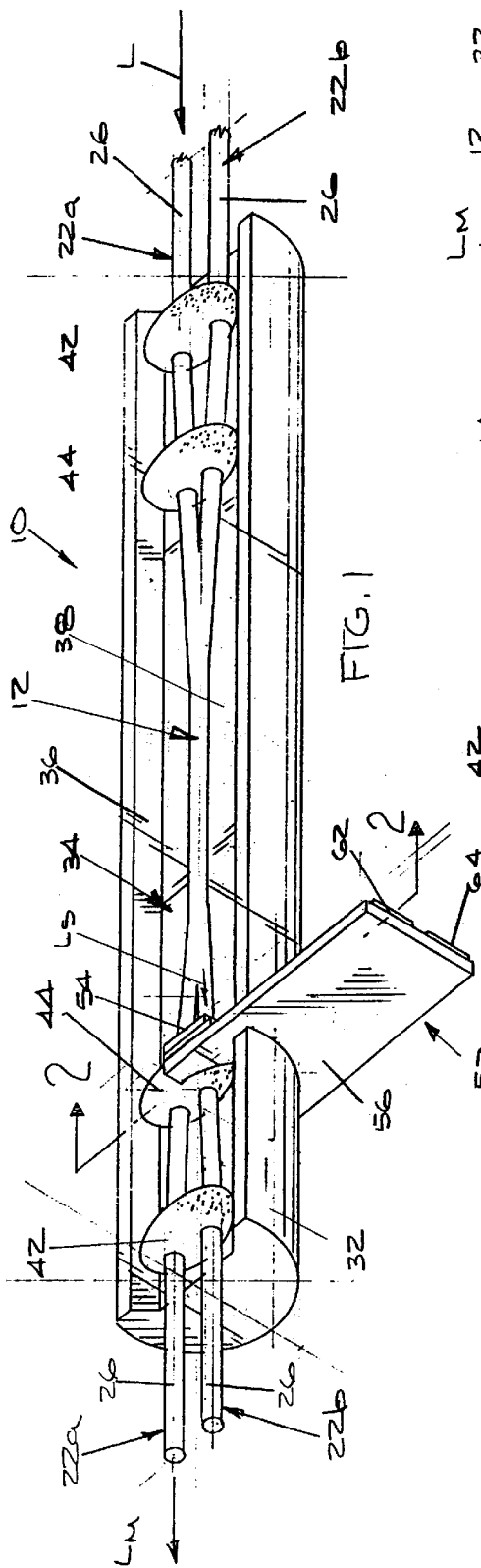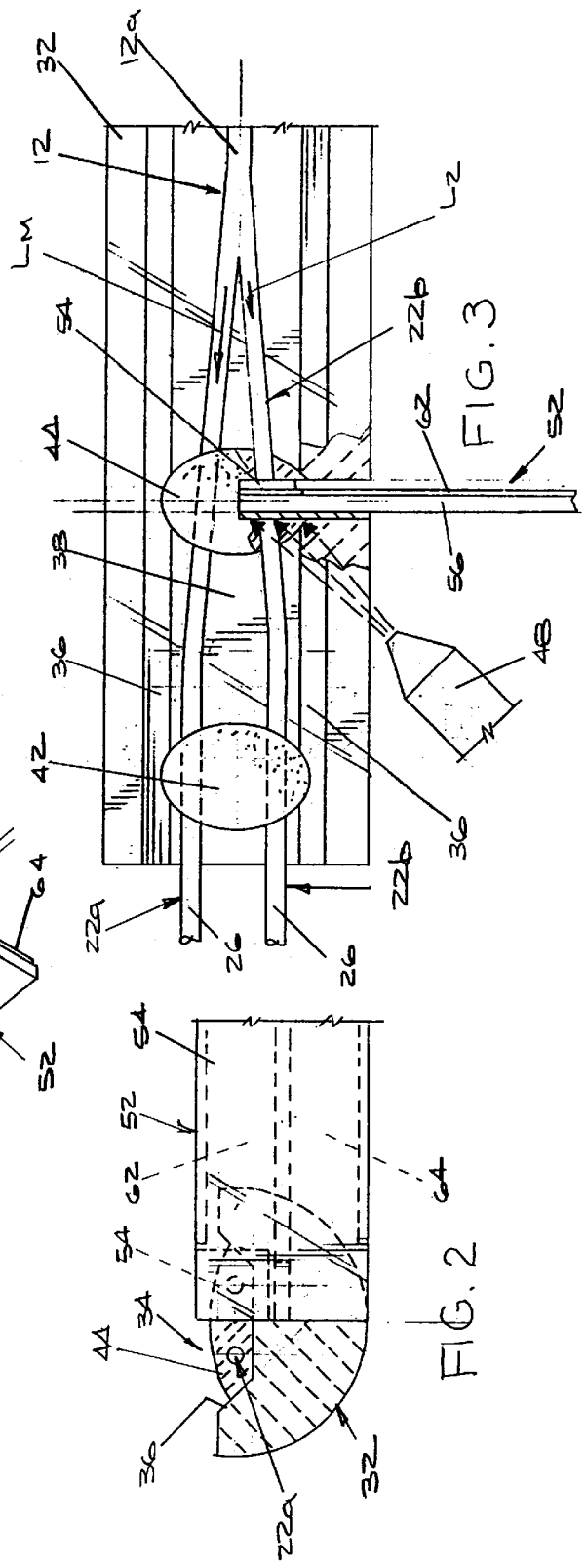

DEVICE FOR GENERATING ELECTRICAL SIGNAL THAT IS A FUNCTION OF THE OPTICAL POWER IN OPTICAL FIBER, AND METHOD OF FORMING THE SAME

FIELD OF THE INVENTION

The present invention relates to fiber optic devices, and more particularly to a detector for generating an electrical signal that is a function of the optical power in an optical fiber.

BACKGROUND OF THE INVENTION

In recent years, there has been a widespread and global deployment of fiber optic networks and systems. The ability to monitor and control the optical power within an optical fiber is important to the operation of such networks and systems.

The present invention provides an optical detector for generating an electrical signal that is a function of the optical power in an optical fiber.

SUMMARY OF THE INVENTION

In accordance with a preferred embodiment of the present invention, there is provided a device for generating an electrical signal that is a function of the optical power in an optical fiber. The device is comprised of a support substrate, a fused, bi-conically-tapered splitter-coupler, and a glass bead securing an optical fiber extending from the splitter-coupler to the substrate. An opening in the glass bead forms a gap in the optical fiber. A light-sensitive device is disposed in the opening to receive light traveling through the optical fiber from the splitter-coupler.

It is an object of the present invention to provide a device for detecting optical power within an optical fiber and for generating an electrical signal that is a function of the optical power in an optical fiber.

It is another object of the present invention to provide a device as described above that is reliable and simple to manufacture.

Another object of the present invention is to provide a device as described above which utilizes a fused bi-conical coupler.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 1 is a perspective view of an optical device for generating an electrical signal that is a function of the optical power in an optical fiber illustrating a preferred embodiment of the present invention;

FIG. 2 is an enlarged, sectional view taken along lines 2—2 of FIG. 1;

FIG. 3 is a top plan view of one end of the device shown in FIG. 1, schematically illustrating how a photo sensor is mounted thereto;

DETAILED DESCRIPTION OF PREFERRED EMBODIMENT

Figure 4:
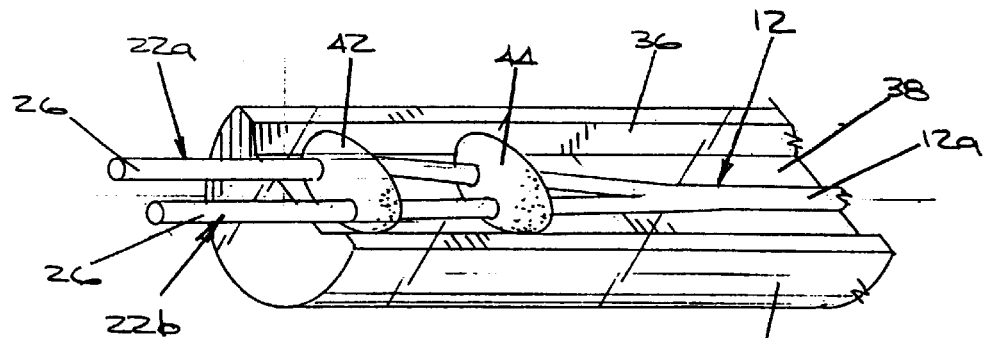
FIG. 4 is a perspective view of one end of a coupler mounted to a substrate according to a preferred embodiment of the present invention.

Referring now to the drawings wherein the showings are for the purpose of illustrating a preferred embodiment of the invention only, and not for the purpose of limiting same, the Figures show a device 10 for generating an electrical signal that is a function of the optical power in an optical fiber. (In the drawings, the respective parts in many instances are not drawn to scale, and in some instances, are exaggerated for the purposes of illustration).

Device 10 is comprised of an "n" by "m" fiber optic coupler 12 that is mounted onto a substrate 32. In the embodiment shown, coupler 12 is a 2×2 fused, bi-conically-tapered splitter-coupler. Coupler 12 is formed from two continuous optical fibers, designated 22a, 22b, which have been coupled by conventionally known methods. Coupler 12 has a coupling region, designated 12a. Each fiber 22a, 22b has an outer jacket or buffer (not shown) comprised of a polymeric material that surrounds inner glass fiber cladding 26. As is conventionally understood, the jacket or buffer of fibers 22a, 22b are removed along a portion of their length to facilitate the manufacture of coupler 12. Fibers 22a, 22b are coupled to produce a desired coupling ratio between fibers 22a, 22b, depending upon the application. If the optical power in an optical fiber is to be measured, optical fibers 22a, 22b are preferably coupled to produce a coupling ratio of 95% to 5%, more preferably, 98% to 2%, and most preferably, 99% to 1% or less, wherein only a small fraction (5% or less) of light to be measured traveling in the one fiber will be split to the other fiber.

As will be appreciated from a further reading of the specification, the present invention may also find advantageous application where a beam of light is used to perform work. In this respect, microelectromechanical systems (MEMS) can be powered by light converted to electricity. In such applications, the fibers are preferably coupled, such that a large portion of light in the one fiber is coupled to the fiber where it is to be converted to electricity, and only a small portion of the light remains in the original fiber for a communication system.

Figure 6:
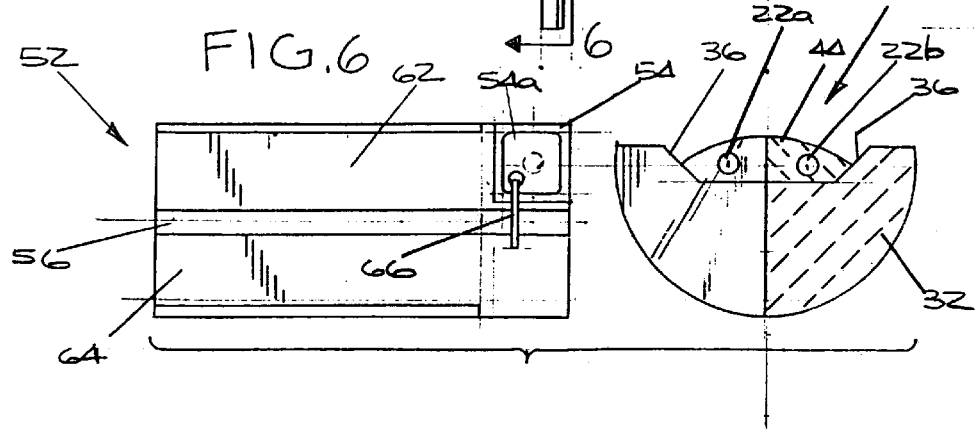
FIG. 6 is a sectional view taken along lines 6—6 of FIG. 5 showing a photo sensor removed from the slot.

Coupler 12 is fixedly mounted onto substrate 32. In the embodiment shown, substrate 32 is a cylindrical rod having a longitudinally extending groove 34 formed therein. Groove 34 is generally defined by a pair of planar, sloping side surfaces 36 and a planar bottom surface 38, as best seen in FIGS. 2 and 6. Substrate 32 is provided to support coupler 12. In the embodiment shown, coupler 12 is mounted to substrate 32 by a small amount of epoxy 42 disposed at opposite sides of coupling region 12a. The primary purpose of epoxy 42 is to hold coupler 12 in place upon substrate 32 until coupler 12 is subsequently secured to substrate 32 by a glass bonding composition 44. Glass bonding composition 44 is comprised essentially of a glass powder and a volatile solvent in a slurry form. The slurry is allowed to dry by allowing the volatile solvent to evaporate, resulting in a solid mass that is softened, preferably by a laser 48 (schematically illustrated in FIG. 3), to bond glass fibers 26 of optical fibers 22 to substrate 32. In this respect, bonding composition 44 and substrate 32 are preferably formed of glass having similar physical properties, e.g., coefficient of thermal expansion, as the glass-forming cladding of fibers 22. A suitable glass-based bonding composition, is disclosed in prior U.S. Pat. Nos. 5,500,917 and 5,682,453 both to Daniel et al., the disclosures of which are expressly incorporated herein by reference.

In accordance with the present invention, a light-sensitive device 52 is disposed in line with one optical fiber 22b to receive light flowing therethrough. In the embodiment shown, light-sensitive device 52 is a photo detector 54 that is mounted on a substrate 56. In the embodiment shown, photo detector 54 is a photo diode, manufactured by Judson Technologies of Montgomeryville, Pa., and designated by Part No. J16-CXX-S400U-SC-GOULD. As will be appreciated by those skilled in the art, other photo detector junctions (PN, PIN) of germanium, and other device technologies, such as InGaAs (indium gallium arsenide) may also find advantageous application in the present invention. Photo detector 54 is generally a flat, rectangular device having a light-sensitive, front surface 54a, and a non-sensitive back surface 54b.

Substrate 56, as best seen in FIG. 6, is a generally flat, rectangular plate, that is preferably formed of a ceramic material, such as by way of example and not limitation, alumina ($Al_2O_3$). One side of the substrate includes two, spaced-apart, side-by-side conductive leads 62, 64, typically formed of gold, that are similar to trace lines of a printed circuit board.

Back side 54b of photo diode 54, which is all metal, is mounted onto lead 62 to be in electrical contact therewith. In a preferred embodiment, back side 54b of photo diode 54 is eutectically bonded to lead 62 on substrate 56. Depending upon how light-sensitive device 52 is attached to substrate 32, as shall hereinafter be described, alternate means, such as a conductive epoxy, may be used to conductively attach the conductive back side 54b of photo diode 54 to lead 62. An electrical path is formed from the front side of photo diode 54 to lead 64 by a bridging connecting wire 66. In the embodiment heretofore described, lead 62 is a cathode lead and lead 64 is an anode lead for photo diode 54.

Figure 5:
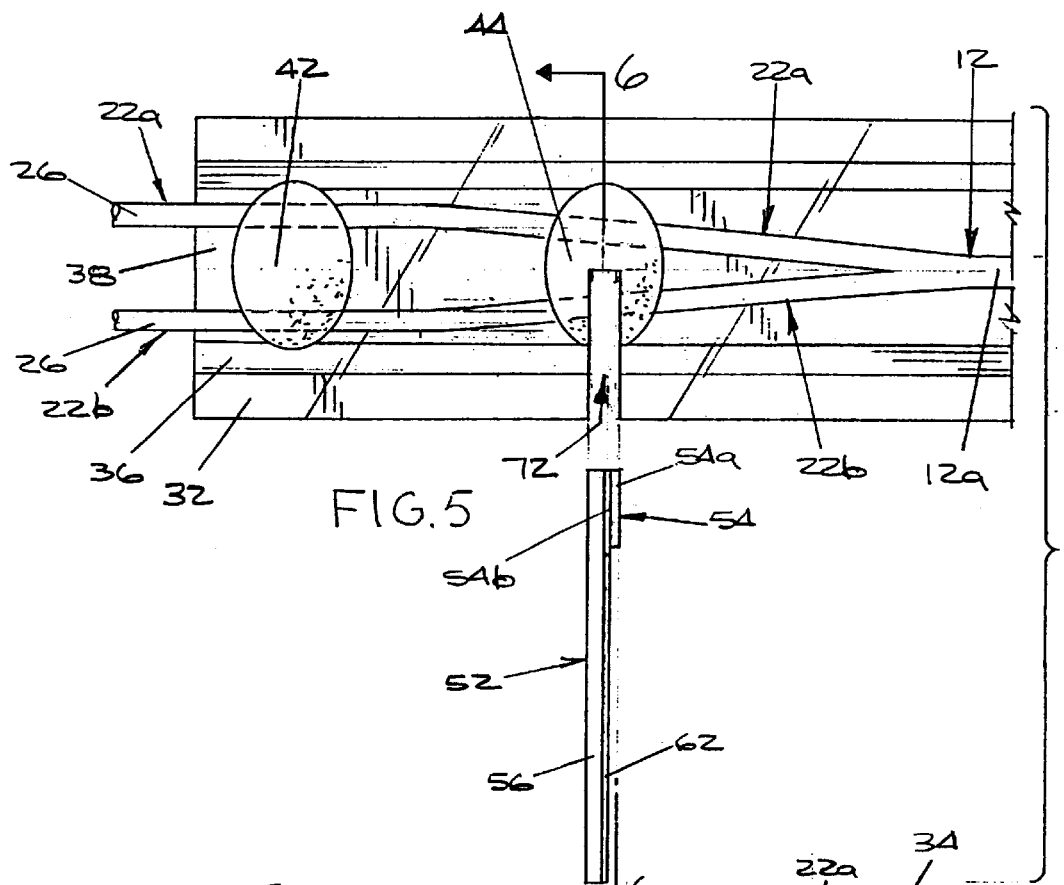
FIG. 5 is a top plan view of the coupler and substrate shown in FIG. 1 with a slot formed therein to receive a photo sensor.

Light-sensitive device 52 is disposed within a slot 72 (as best illustrated in FIG. 5) that is cut through substrate 32, glass bead 44 and optical fiber 22b. Slot 72 is preferably cut by a highly accurate, precision rotary saw having a diamond blade. A saw blade manufactured by Disco Hi-Tech America, Inc. of Chantilly, Va., under Model No. PIA 862 SD4000 N100 BR50, is used to form slot 72. As will be appreciated, other precision saws, saw blades and other types of machining processes, may find advantageous application in forming slot 72. In this respect, the saw used to form slot 72 in and of itself forms no part of the present invention.

As best seen in FIG. 5, slot 72 extends through approximately one-half (½) of substrate 32 and through one optical fiber of coupler 12, severing the same. In the embodiment shown, the severed fiber is fiber 22b. Fiber 22b is severed to one side of coupling region 12a. Fiber 22b is severed at a location where fiber 22b is rigidly secured to substrate 32 to ensure a smooth, clean cut through fiber 22b. Preferably, fiber 22b is cut at or near a location where fiber 22b is rigidly secured to substrate 32 by epoxy bead 42 or glass bead 44. In the embodiment shown, slot 72 is formed through glass bead 44, thereby severing fiber 22b at a location where fiber 22b is encased and secured to substrate 32 by glass bead 44. As best seen in FIG. 5, slot 72 does not penetrate, i.e., does not cut into, fiber 22a.

The width W of slot 72 is dimensioned to be slightly larger, i.e., slightly wider, than the thickness of light-sensitive device 52. In this respect, light-sensitive device 52 may be easily positioned within slot 72. Light-sensitive device 52 is positioned such that light-sensitive front surface 54a of photo diode 54 faces coupling region 12a, and a portion of light-sensitive front surface 54a is aligned with and intersects optical fiber 22b, as best illustrated in FIG. 3. Slot 72 is cut within substrate 32 such that photo diode 54 is perpendicular to optical fiber 22b, when light-sensitive device 52 is inserted within slot 72.

Light-sensitive device 52 may be secured in place to substrate 32 by numerous types of adhesive material applied to back surface of substrate 56. In a preferred embodiment, a glass-based bonding composition, such as that described above, is used to secure light-sensitive device 52 to substrate 32. With light-sensitive device 52 in the appropriate position within slot 72, a bead (not shown) of the glass-based bonding composition may be placed along the upper edge of the existing bead 44 where bead 44 meets the back surface substrate 56. Focused and localized heat is applied to the bead of glass-based bonding material to soften the glass therein. The glass-based bonding composition is preferably softened by a laser directed to the backside of substrate 56, as schematically illustrated in FIG. 3.

In accordance with a preferred embodiment of the present invention, existing glass bead 44 is softened by the application of localized heat to soften the glass material of glass bead 44, wherein the softened glass material will bond the back surface of substrate 56 to substrate 32.

As best seen in FIG. 3, no bonding material is disposed between light-sensitive, front surface 52a and the cut end of optical fiber 22b.

Referring now to the operation of a device 10 for generating an electrical signal that is a function of the optical power in an optical fiber, leads 62, 64 of device 10 are attached to a monitor (by means not shown) that detects and interprets signals from device 10. A light wave L to be measured is directed into a launch fiber of device 10. In the embodiment shown, optical fiber 22a is the launch fiber, as indicated in FIG. 1. As indicated above, for a device 10 intended to provide a signal indicative of the optical power in an optical fiber, coupler 12 is formed so that only a small portion of the light in launch fiber 22a is coupled to a receiving fiber 22b. Accordingly, as a result of the coupling region 12a, a small portion, $L_s$, of light wave L is split into optical fiber 22b, a major portion, $L_m$, of light wave L being maintained in optical fiber 22a and continuing along such fiber. Light $L_s$ split into fiber 22b impacts light-sensitive, front surface 54a of photo diode 54. Based upon the intensity of light $L_s$ impinging upon front surface 54a, an electrical signal is generated by photo diode 54 and sent as an electrical signal along electrical leads 62, 64 to a monitoring device (not shown). The intensity of portion $L_s$ of light wave L that is split into optical fiber 22b is a function to the intensity of the light $L_m$ remaining in optical fiber 22a and thus provides an indication of such intensity. As will be appreciated by those skilled in the art, the electrical signal generated by device 10 is a function of the type of photo diode 54 used, the number and wavelength(s) of light being detected and the intensity of such light. In this respect, it is clear that different types of photo diodes 54 will provide different signals. With respect to the light itself, equal optical powers at different wavelengths will produce different currents, as will a light comprised of a single or multiple wavelengths. Still further, it will be appreciated that the response of a photo diode is not linear. Accordingly, the electrical signal provided by device 10 must be interpreted considering these factors.

The present invention thus provides a relatively simple, yet reliable device for monitoring the intensity of a light signal in an optical fiber. Bead 44 of glass bonding material fixedly holds optical fiber 22b in place during the formation of slot 72 and the attachment of photo detector 54 to substrate 32. Bead 44 prevents shifting or damage to optical fiber 22b and coupler 12 during formation of slot 72, and further maintains proper alignment of optical fiber 22b with photo detector 54 after assembly and during use.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A device comprising:

a support substrate;

a fused, bi-conically-tapered splitter-coupler;

a glass bead securing an optical fiber extending from said splitter-coupler to said substrate;

an opening in said glass bead forming a gap in said optical fiber and said substrate; and a light-sensitive device disposed in said opening to receive light traveling through said optical fiber from said splitter-coupler, wherein said light-sensitive device is secured to said substrate by an adhesive material applied to a back surface of said light-sensitive device.

2. A device as defined in claim 1, wherein said splitter-coupler is a 2×2 fused, bi-conically-tapered splitter-coupler formed from a first optical fiber and a second optical fiber, said light-sensitive device being disposed to detect light traveling through said second optical fiber from said splitter-coupler.

3. A device as defined in claim 2, wherein said coupler has a coupling ratio wherein less than 5% of light entering said coupler along said first fiber is coupled to said second fiber.

4. A device as defined in claim 3, wherein said light-sensitive device is a photo diode.

5. A device as defined in claim 4, wherein said photo diode is generally flat and said opening in said glass bead is a slot.

6. A device as defined in claim 3, wherein said light-sensitive device is bonded to said glass bead.

7. A device as defined in claim 2, wherein said coupler has a coupling ratio wherein less than 1% of light entering said coupler along said first fiber is coupled to said second fiber.

8. A device for generating an electrical signal that is a function of the optical power in an optical fiber, said device comprised of:

a support substrate;

an n×m fused, bi-conically tapered splitter-coupler having a coupling region, a launch fiber to one side of said coupling region and at least two receiving fibers to another side of said coupling region for receiving light from said launch fiber, said splitter-coupler being fixedly mounted to said substrate;

an opening in one of said receiving fibers forming a gap in said one receiving fiber; and a light-sensitive device disposed in said opening mounted to said substrate to receive light traveling through said optical fiber from said splitter-coupler.

9. A device as defined in claim 8, wherein said one receiving fiber is secured to said substrate by an adhesive material.

10. A device as defined in claim 9, wherein said opening in said one receiving fiber is formed where said one receiving fiber is secured to said substrate.

11. A device as defined in claim 10, wherein said opening is formed through said one receiving fiber and through the adhesive material securing said one receiving fiber to said substrate.

12. A device as defined in claim 10, wherein said adhesive material is a glass-based material.

13. A device as defined in claim 10, wherein said adhesive material is a polymer-based material.

14. A device as defined in claim 10, wherein a majority of the light traveling in said launch fiber is coupled to said one receiving fiber.

15. A device as defined in claim 10, wherein a minority of the light traveling in said launch fiber is coupled to said one receiving fiber.

16. A device as defined in claim 15, wherein said splitter-coupler is a 2×2 fused, bi-conically-tapered splitter-coupler formed from a first optical fiber and a second optical fiber, said light-sensitive device being disposed to detect light traveling through said second optical fiber from said splitter-coupler.

17. A device as defined in claim 16, wherein said splitter-coupler has a coupling ratio wherein less than 5% of light entering said coupler along launch fiber is coupled to said one receiving fiber.

18. A device as defined in claim 16, wherein said splitter-coupler has a coupling ratio wherein less than 1% of light entering said coupler along said launch fiber is coupled to said one receiving fiber.

19. A device as defined in claim 9, wherein said one receiving fiber is secured to said substrate by a bead of glass and said opening is through said substrate, said bead of glass and said one receiving fiber.

20. A device as defined in claim 19, wherein said light sensitive device is a photo diode secured to said substrate.

* * * * *